Oct. 12, 1971  GUSTAAF VAN'T HOF  3,611,728
STRUCTURE FOR CONFINING AND STORING FLOATING LIQUID PRODUCTS
Filed June 2, 1969  2 Sheets-Sheet 1
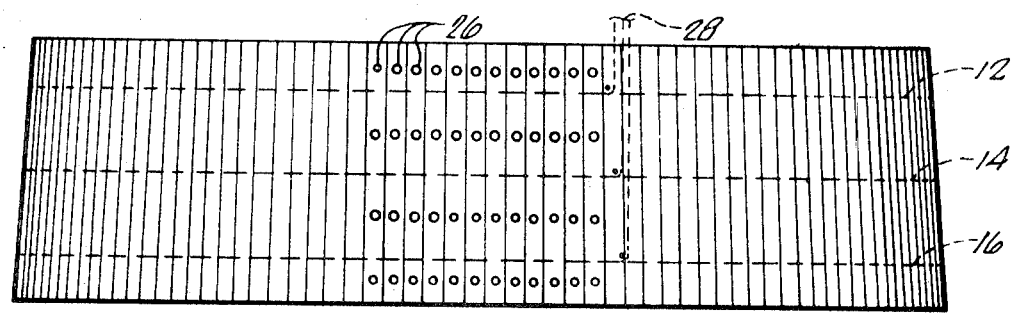
FIG. 1.
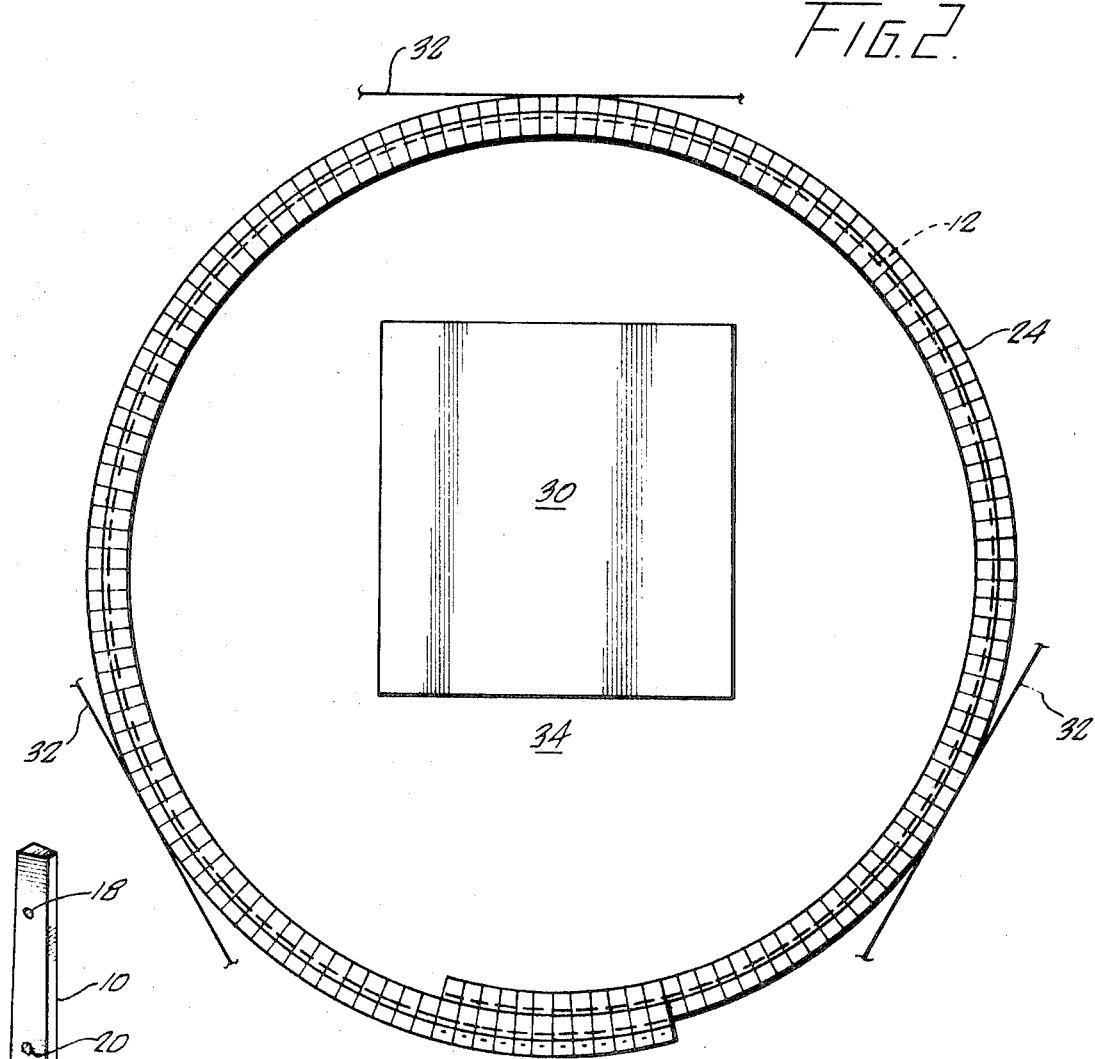
FIG. 2.
FIG. 3.
INVENTOR.
GUSTAAF VAN'T HOF
BY
Christie, Parker & Hale
ATTORNEYS.

United States Patent Office 3,611,728
Patented Oct. 12, 1971

3,611,728
STRUCTURE FOR CONFINING AND STORING
FLOATING LIQUID PRODUCTS
Gustaaf Van't Hof, 10021 Lesterford Ave.,
Downey, Calif. 90240
Filed June 2, 1969, Ser. No. 829,303
Int. Cl. E02b 15/04
U.S. Cl. 61—1 F                                    7 Claims

ABSTRACT OF THE DISCLOSURE

A flexible enclosure formed from a plurality of buoyant vertical members joined side-by-side in a substantially liquid-tight relationship for containing and storing a liquid which floats upon the surface of another liquid.

BACKGROUND OF THE INVENTION

There have, in the past, been advanced various proposals for confining a liquid or other material floating on water to the immediate area from which the material has escaped or leaked. Attention has been particularly directed to the problem of oil or other lightweight liquids leaking from ships, barges, or containers. To this end, various arrangements of booms, seines, and similar barriers have been proposed.

In recent years, off-shore oil drilling operations have presented the problem of potential pollution of ocean areas by inadvertent escape of oil either from the well itself or from fissures formed in the ocean bottom during drilling operations. Control of such pollution requires a means which can be quickly and conveniently positioned at the well site to contain and store relatively large volumes of leaking oil until the oil can be removed from within the confined zone. Since off-shore drilling operations are conducted in the open sea where severe wave action can occur, it is also required that the confining structure be capable of withstanding the large forces produced by wave action.

The absence of prior art structures combining the features necessary for effective containment of large volumes of leaking oil is demonstrated by the pollution resulting in early 1969 from oil leakage at an off-shore drilling site near Santa Barbara, Calif. The inability to contain and store escaping oil within a relatively confined area resulted in movement of an oil slick over a large areal expanse with consequent injury to marine life and damage to affected shore lines, shore facilities, and small craft.

SUMMARY OF THE INVENTION

The present invention is a flexible or elastic structure for containing and storing a liquid such as oil which floats on the surface of another liquid such as water. It comprises a plurality of buoyant vertical members which are joined together in substantially liquid-tight side-by-side relationship to form a continuous wall having a first end and a second end. Means are provided for joining a portion of the wall adjacent the first end to a portion of the wall adjacent the second end to form thereby an open-ended enclosure which extends above and beneath the surface of the water.

The enclosure that is formed is substantially cylindrical in shape and has diametral dimensions adapted to meet the particular conditions of areal and volumetric requirements for a particular site. The height of the vertical members is controlled by similar considerations. For example, to provide a confining area around a small drilling platform, vertical members 12 feet in height can be joined together to form a continuous wall which, when made into an enclosure, has a diameter of about 100 feet and surrounds the drilling platform.

The enclosure can be positioned relative to the water surface so that approximately 3 to 4 feet of the vertical elements extend above the water surface and the remaining 8 to 9 feet extend beneath the water surface. The portion extending beneath the water surface and a small part of the portion extending above the water comprise the confining or storage section, whereas the balance of the upper portion has a height sufficient to prevent escape of the contained liquid due to current or wave action.

Preferably, the vertical members of a buoyant material such as wood or plastic are joined together, as by cables, at a shore facility. The continuous wall that is formed is then towed or carried in a folded state to the particular site where the enclosure is to be made. The enclosure is formed at the site by overlapping several members at opposite ends of the wall and bolting them together. The cables are prestressed by use of hydraulic jacks or other methods to form an encompassing cylindrically-shaped enclosure. The height of the enclosure above the water surface may be controlled by attaching buoyancy tanks or weights to the enclosure as required.

The structure of the present invention is flexible and may be readily transported from one site to another. In place, even though it is anchored down, limited movement of the entire enclosure occurs responsive to wave action so that the effect of the forces produced by wave action upon the structure is minimized. Additionally, the use of separate elements to form the ring provides a spring action, imparting thereby a flexibility or elasticity to the enclosure which further improves its capability to withstand wave action.

BRIEF DESCRIPTION OF THE DRAWINGS

The structure of the present invention will be more fully understood from the following description made in conjunction with the accompanying drawings, in which:

FIG. 1 is an elevational view of a continuous wall formed into an enclosure in accordance with the present invention;

FIG. 2 is a plan view of the enclosure in place around a drilling platform;

FIG. 3 is a perspective view of one of the plurality of members forming the enclosure;

PREFERRED EMBODIMENT OF THE INVENTION

Figure 5:
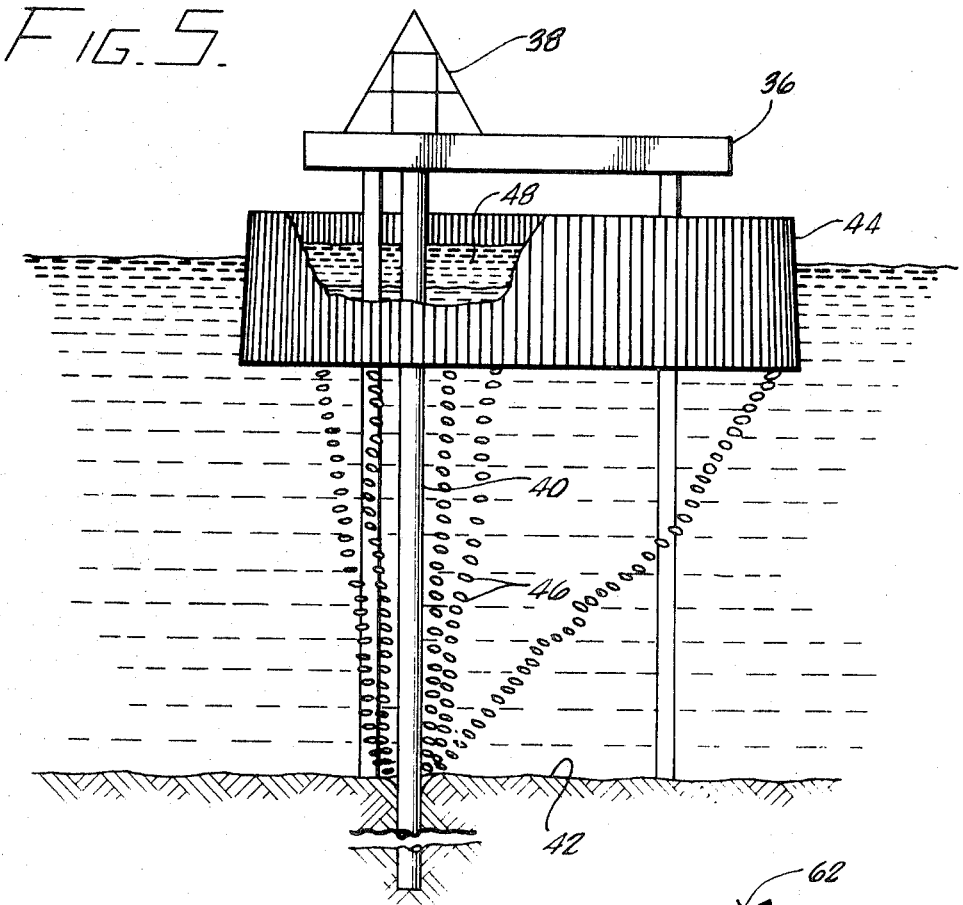
FIG. 5 is a schematic view showing an enclosure according to the present invention in place around an off-shore drilling platform and a leaking well.

With particular reference to FIGS. 1 and 3, a trapezoidally-shaped member 10 of wood or other buoyant material is disposed in vertical side-by-side relationship with a plurality of similarly-shaped members to form an elongate wall. The members are joined together by steel cables 12, 14, and 16 which pass respectively through upper hole 18, middle hole 20, and lower hole 22 in each of the wooden elements.

The elongate wall can be towed or carried aboard a ship or barge to the site where it is to be formed into an enclosure 24. The enclosure, shown in elevation in FIG. 1 and in plan view in FIG. 2, is formed by overlapping several vertical members at opposite ends of the elongate wall and fastening these together with bolts 26 or other fastening means to provide an open-ended cylindrical or elliptical enclosure. Temporary weighting or the like can be used to place the members in an upright position.

Through hydraulic jacks 28 positioned at the overlapping areas of the enclosure, tension is applied to each of the cables to prestress them. Preferably, the members are tiltted inwardly at their upper ends to provide an enclosure having a slightly conical surface, which also assists in resisting wave action and improves the structural strength of the enclosure. The members may be tilted inwardly as much as 60° from the vertical.

The vertical members are initially joined together to form the elongate wall so that the shorter side of the trapezoidal cross-section of each element is on the same side of the wall. These shorter sides are drawn together when the enclosure is formed to define the inner diameter of the enclosure.

As shown in FIG. 2, enclosure 24 is positioned around a drilling platform by anchor cables 32 to define an enclosed area 34. This area together with the length to which the vertical elements forming the enclosure extend beneath the water surface define the volumetric storage capacity for confining a lighter-than-water liquid.

FIG. 5 is a schematic representation of an off-shore oil drilling site having a floating platform 36 supporting a drilling rig 38. Oil well casing 40 extends from the drilling platform to beneath the surface of the ocean floor 42. A buoyant enclosure 44 formed in accordance with the present invention as described above encompasses the floating platform.

In FIG. 5, oil leaking from a fissure at the well floats upwardly through the water as depicted by bubbles 46. Despite the presence of ocean currents, the enclosure can be positioned over the source of leakage so that it confines and stores the oil reaching the surface of the water, as shown at 48 within the enclosure. The stored oil can then be removed as required by pumping into barges or tankers. It will be appreciated that, in the event the oil leakage is occurring at some point remote from the drilling platform, the enclosure can be positioned at the location on the water where the oil surfaces.

Figure 4:
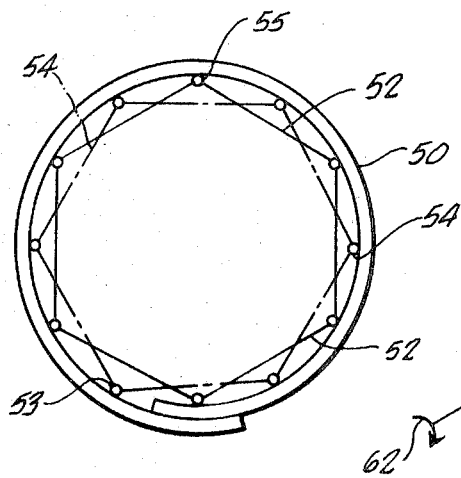
FIG. 4 is a schematic plan view showing a method of reinforcing the enclosure.

With reference to FIG. 4, an enclosure 50 is reinforced by a first set of slack cables 52 secured to six bolts 53 spaced equidistantly over the inner diameter of the enclosure and by a second set of slack cables 54 secured to six bolts 55 spaced intermedially between bolts 53.

Figure 6:
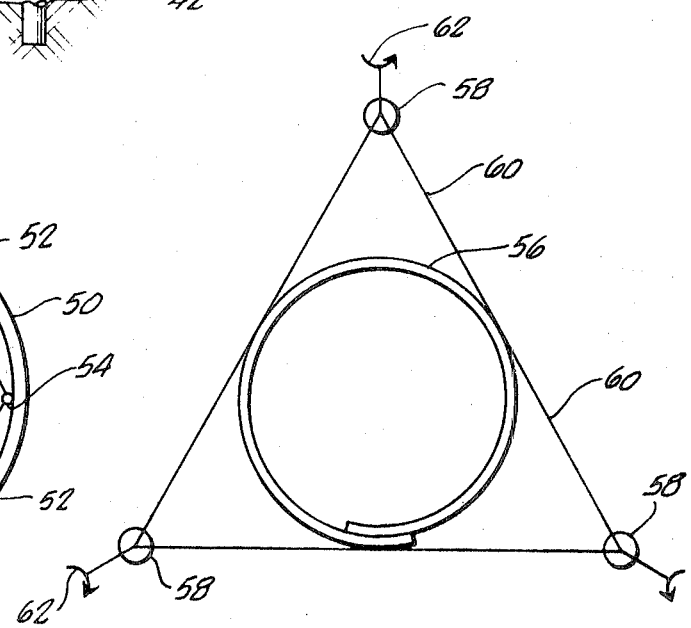
FIG. 6 is a schematic plan view showing an enclosure according to the invention position with floating buoys and anchors to provide a slack mooring.

With reference to FIG. 6, an enclosure 56 formed as previously described is positioned by three buoys 58 joined to the enclosure by cables 60 at points substantially equidistant from the center of the enclosure. The buoys are secured in position by anchors 62 and provide in combination with the cables and anchors a slack mooring arrangement which absorbs wave action. If severe wave action is anticipated, vertical members such as those from which the enclosure is formed may be made into walls and joined to the enclosure to extend seawardly from the enclosure as wave-breaking fronts.

Although the enclosure of the present invention has been particularly described above as used for containing and storing leaking oil, it will also be appreciated that it can be used for storage of deliberately released liquids. For example, the size of many ocean-going tankers requires, because of the inadequacy of shore facilities, that the tankers be moored off-shore. The enclosure of the invention can be used as an in-water storage tank for oil at an off-shore site conveniently accessible to large tankers. Further, two or more smaller enclosures can be grouped and surrounded by one larger enclosure according to the invention so that the latter can confine any oil which escapes due to failure of one of the smaller enclosures.

I claim:

1. A flexible structure for containing and storing a first liquid which floats upon the surface of a second liquid comprising:

(a) a plurality of buoyant members having a vertical dimension considerably greater than their width;
    (b) at least one opening associated with each member to operatively connect each of said members with a cable passing through the opening;
    (c) said cable joining said members in vertical side-by-side relationship to form a continuous wall having a first end and a second end;
    (d) means for joining a portion of the wall adjacent the first end to a portion of the wall adjacent the second end to form an enclosure extending above and beneath the surface of the second liquid; and
    (e) means for prestressing the cable and bringing each of the members into substantially liquid-tight relationship.

2. Structure in accordance with claim 1 wherein the ends of the members above the liquid surface are displaced from the vertical to extend inwardly toward the center of the enclosure.

3. Structure in accordance with claim 1 wherein a plurality of buoys are connected to the enclosure exteriorly thereof and anchoring means are connected to each buoy.

4. A flexible structure for containing and storing a first liquid which floats upon the surface of a second liquid comprising:

(a) a plurality of buoyant members each having a trapezoidal cross-section and including at least two vertically-spaced-apart holes;
    (b) cables passing through the holes to join said members vertical in side-by-side relationship to form a continuous wall having a first end and a second end;
    (c) means for joining a portion of the wall adjacent the first end to a portion of the wall adjacent the second end to form an enclosure extending above and beneath the surface of the second liquid; and
    (d) means for prestressing the cables and bringing the vertical members into substantially liquid-tight relationship.

5. Structure in accordance with claim 4 wherein the vertical members are joined to form a continuous wall having the shorter parallel sides of the elements disposed to define one surface of said wall.

6. A flexible structure for containing and storing a first liquid which floats upon the surface of a second liquid comprising:

(a) a plurality of buoyant members having a trapezoidal cross-section;
    (b) means joining said members in substantially liquid-tight vertical side-by-side relationship to form a continuous wall having a first end and a second end with the shorter parallel sides of the elements disposed to define one surface of said wall; and
    (c) means for joining a portion of the wall adjacent the first end to a portion of the wall adjacent the second end to form an enclosure extending above and beneath the surface of the second liquid.

7. Structure in accordance with claim 6 wherein said one surface of the wall is the inner surface of the enclosure formed by joining the first end and the second end of the wall.

References Cited

UNITED STATES PATENTS 3,230,967　1/1966　Castro _____ 61—.5
3,476,246　11/1969　Dahan _____ 61—1 F PETER M. CAUN, Primary Examiner